United States Patent [19]

Schwindt et al.

[11] 4,022,239

[45] May 10, 1977

[54] HYDRAULIC-METERING MULTIPLE VALVE

[76] Inventors: Bernell W. Schwindt; Jackson T. Schwindt, both of 17621 Irvine Blvd. Suite 101, Tustin, Calif. 92680

[22] Filed: July 17, 1975

[21] Appl. No.: 596,898

[52] U.S. Cl. .................... 137/119; 137/624.14; 137/624.2; 239/69
[51] Int. Cl.[2] .................. A01G 25/00; F16K 11/20
[58] Field of Search ........ 137/119, 624.11, 624.13, 137/624.15, 624.18, 624.2, 624.14, 624.16; 239/66, 69, 70

[56] References Cited
UNITED STATES PATENTS

| | | | |
|---|---|---|---|
| 2,426,779 | 9/1947 | MacDonald | 137/624.16 X |
| 2,821,434 | 1/1958 | Hunter | 239/66 X |
| 3,127,108 | 3/1964 | Harris | 239/66 X |
| 3,372,708 | 3/1968 | Hotchkin | 239/66 X |
| 3,444,896 | 5/1969 | Van Der Veer | 251/230 X |
| 3,779,269 | 12/1973 | Gould | 137/624.14 X |

Primary Examiner—Alan Cohan

[57] ABSTRACT

A hydraulic-metering, multiple-valve device for use primarily in a sprinkler system associated with large parcels of land. The valve device comprises a valve housing having an inlet and a plurality of outlets, wherein each outlet is controlled by corresponding valve means disposed within said housing and each valve means communicates with a flow channel having a drive means operably disposed therein and in direct alignment with the inlet of the housing. There is a timer-sequential metering means having a gear train interconnected between a sequencer drum and the drive means for controlled rotation of the drum, the drum being provided with a plurality of pins positioned and mounted to the surface thereof which cooperate with individual valve-actuating mechanisms, to selectively open and close the individual valve means as the drum rotates. By selecting the number and location of the pins, the sequence and time of operation of each valve may be readily selected.

10 Claims, 11 Drawing Figures

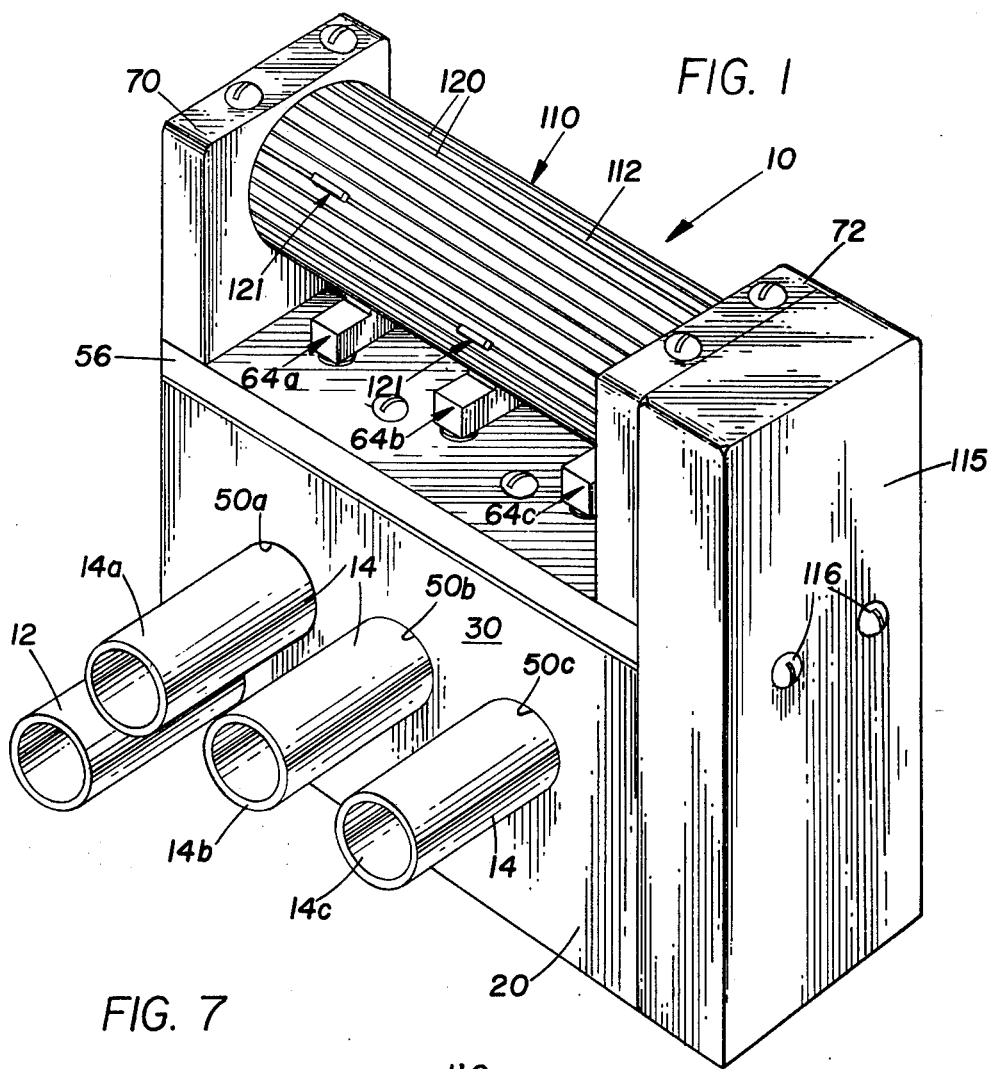
FIG. 1
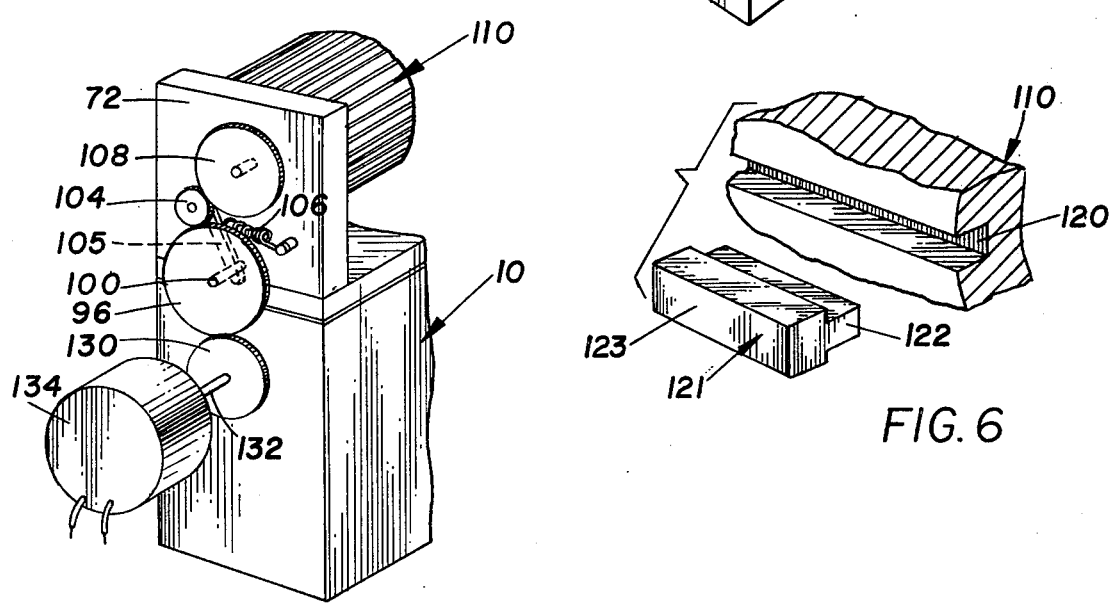
FIG. 7
FIG. 6

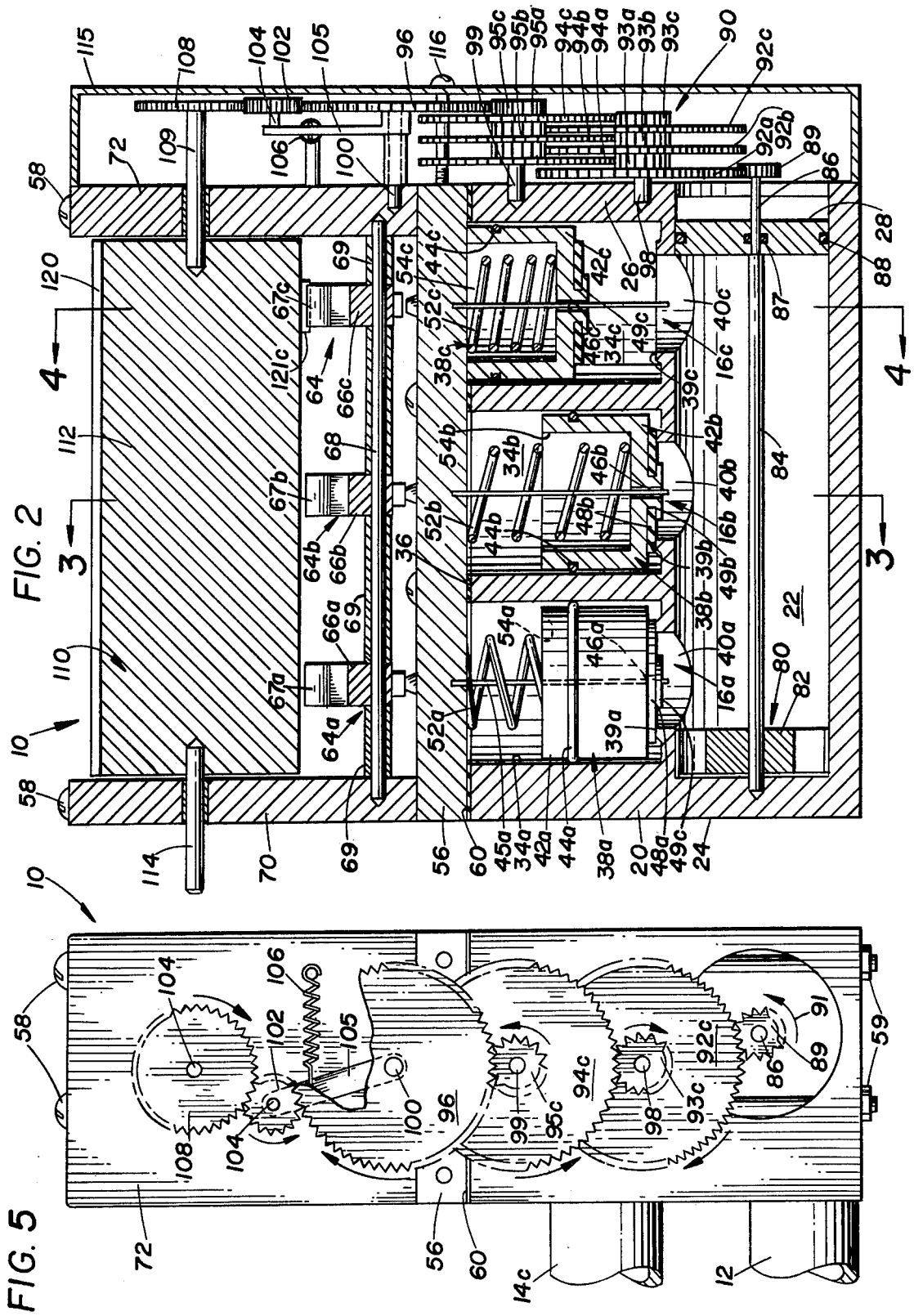

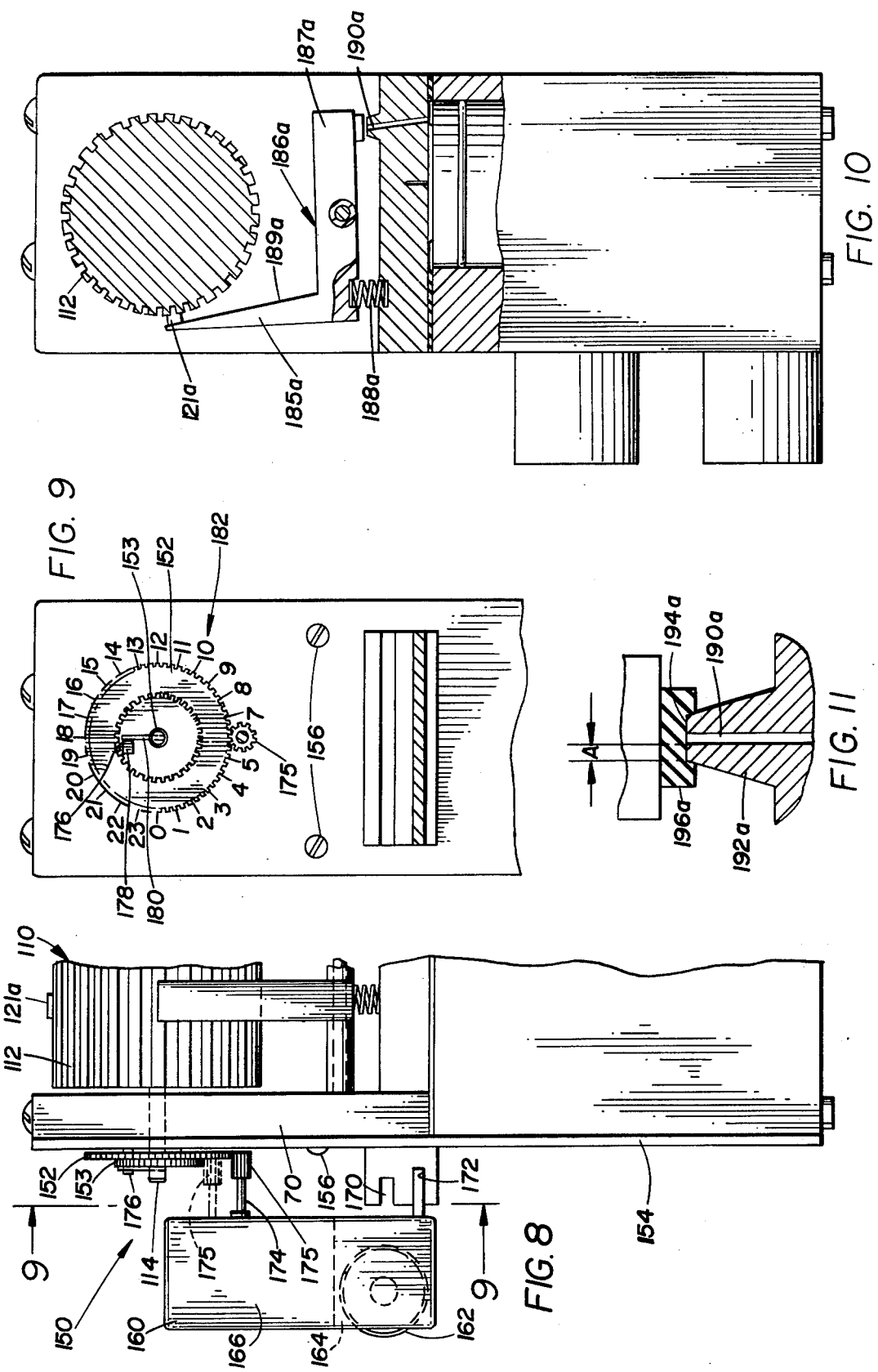

HYDRAULIC-METERING MULTIPLE VALVE

BACKGROUND

1. Field of the Invention

The present invention relates to an automatic hydraulic valve and, more particularly to an automatic, sequentially-controlled, metering, multiple valve having a fluid inlet and a plurality of fluid outlets, and being operative to selectively connect the inlet to any of the outlets in any varying sequence for any amount of time.

2. Description of the Prior Art

As is well known in the art, various problems and difficulties have been and are still being encountered in providing suitable means for regulating the timing and volume of water that is required to properly irrigate large parcels of land — particularly where numerous sections are involved and where the surface area to be watered is of considerable magnitude.

Various types of control valves in conjunction with sprinkler systems are used for the flow of large volumes of water. However, these devices have features that restrict their use, and are complicated to operate and expensive to maintain.

Additionally, many uses presently exist for hydraulic timing valves of the type which are operative, upon activation, to provide a predetermined amount of water flow from the inlet to the outlet thereof and which automatically shut off thereafter. Some of the most common uses of such valves are as flushing valves for use in connection with lavatories and similar types of sanitary apparatus, as automatic faucets, and as shut-off valves for industrial and commercial uses.

Valves of this type generally include a timing member positioned within a valve body which is operative to automatically close the valve after the flow of a predetermined amount of water therethrough. One such timing valve is disclosed in U.S. Pat. No. 3,543,795 issued Dec. 1, 1970, for Hydraulic Timer Valve and Actuator Therefor. That timing valve includes a generally cylindrical and hollow housing and a valve member which is operative to reciprocate between a valve seat in one end of the housing and a timing chamber in the other end to control the flow of fluid from the inlet to the outlet of the valve. Small droplets of water are metered from the valve inlet through an orifice in the valve member, at a fixed rate, into the timing chamber, thereby exerting pressure on the valve member to continually push it into seating relationship with the valve seat to thereby close the valve. Such valve also includes an adjustable cap for determining the time setting thereof.

The above patent points out that many situations exist where it is desirable or necessary to be able to vary and accurately control the time setting of the valve. For example, if such a valve were to be used in connection with an automatic sprinkler system, it would be desirable if the time setting of the valve could be adjusted depending upon soil conditions so that a proper amount of water could be provided thereto. In such a situation, the ability to vary the time setting of the valve over a wide range would be a highly useful feature. It is also pointed out that, in many commercial and industrial uses, a high degree of accuracy and repeatability are important.

To solve this particular problem of the prior art, this patent discloses a mechanism whereby the relatively simple expedient of rotating a valve cap may be utilized to vary the time setting of the valve accurately, within the range of a few minutes to an hour or more. This feature is combined with a unique metering technique which permits the time setting of the valve to be extremely accurate, with a high degree of repeatability in valve operation.

Finally, the above patent also points out that for many uses, such as in connection with automatic sprinkler systems, it is desirable to be able to control the activation of a second timer valve automatically in response to the shutting off of a first valve. For example, in a situation where several parcels of land are to be watered and the water pressure is only sufficient to water one parcel at a time, it would be desirable if the hydraulic timer valve for each parcel could be operated automatically in response to a prior timer valve shutting off. In order to solve this problem, the patent provides an automatic valve actuator which monitors the operation of a first automatic timer valve to determine when the valve shuts off and which turns on a second valve which will then operate in the same manner as the first valve.

While the hydraulic timer valve and the actuator therefor of this U.S. Pat. have been found to have distinct advantages over the prior art in solving the problems discussed previously, still other problems exist. More specifically, because of the construction of the automatic valve actuator, all hydraulic timing valves are identical and each includes the entire timing mechanism and metering apparatus. This duplication of timing mechanisms and metering apparatus in every valve has been found to represent an unnecessary expense. In addition, a difficulty has been encountered in controlling the sequence of operation using the automatic valve actuator. More specifically, the operation of that valve actuator requires each valve to operate in sequence; and it is not possible to selectively skip individual valves once a sequence is established.

SUMMARY

The present invention comprises a hydraulic-metering, multiple-valve device which, in a single unit, selectively controls the flow of fluid through a plurality of fluid-outlet lines to precisely meter a number of gallons to various parcels of land, irrespective of time or supply-pressure variations.

Thus, in the present invention, there is provided a hydraulic-metering, multiple-valve device which comprises a single housing having an inlet port to receive fluid from a fluid-pressure system and a plurality of outlet ports adapted to be connected to a multipurpose sprinkler system, whereby various sections of land can be watered to the amount individually required by each section or parcel.

Disposed within the housing is a plurality of separate valve means to corespond to each outlet, wherein each outlet is allowed to sequencially communicate with the inlet port for water flow therebetween. Included within the housing is a communicating channel positioned between said inlet port and said valve means, and having disposed therein a drive means directly in line with the inlet port, whereby water under pressure entering therethrough operates the drive means.

A timer-sequencial metering means is provided which includes a rotatable sequencer drum operably interconnected to the drive means by a gear train means. As the drum rotates together with a plurality of pre-disposed pins located in the surface thereof, the pins cooperate with individual valve-actuating mechanisms to selectively open and close the individual valve means as the drum rotates.

Accordingly, the amount or volume of water allowed to flow to particular areas to be irrigated is determined by the number of pins located in a contiguous manner with respect to a particular valve — thus, the location of the pins on the drum determines the individual valve means to be operated to allow flow of water through the valve's respective outlet. Through this arrangement and control of fluid, flow time and/or supply pressure variations have no effect on the precisely-metered number of gallons discharged for a given area.

OBJECTS AND ADVANTAGES

The present invention has for an important object a provision wherein the rate of rotation of the drum is controlled by the flow of fluid entering the inlet port by operation of the drive means, thus providing a finite metering of the number of gallons discharging from any particular outlet.

It is another object of the present invention to provide a hydraulic-metering, multiple-valve device having a fluid inlet and a plurality of fluid outlets for selectively controlling the connection between the inlet to any of the outlets, in any sequence, and allowing a discharge of a pre-determined volume of water for each selected outlet.

It is still another object of the invention to provide a hydraulic-metering, multiple-valve device that is easy to service and maintain.

It is a further object of the invention to provide a hydraulic-metering, multiple valve that is relatively inexpensive to manufacture, by including a plurality of individually-operated valves within a single unit having a single control means capable of operating each selective valve.

It is still a further object of the invention to provide a device of this character that is simple and rugged in construction.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 1 is a perspective view of the present hydraulic-metering, multiple-valve device;

FIG. 2 is a cross-sectional view taken substantially along the longitudinal axis of the device as seen in FIG. 1;

FIG. 5 is an end view of the present invention with the end cover removed to show the gear train thereof;

FIG. 6 is a partial, exploded, perspective view of a portion of the drum of the timer-sequencer of FIGS. 1–4;

FIG. 7 is a partial perspective view of the hydraulic-metering, multiple-valve device having an alternative drive arrangement and gear train;

FIG. 8 is partial elevational view of the present invention adapted with an alternative drive and gear train;

FIG. 9 is a cross-sectional view taken substantially along line 9—9 of FIG. 8;

FIG. 10 is a side elevational view of the present invention with a portion thereof broken away to illustrate an alternative arrangement of a rocker arm; and FIG. 11 is an enlarged cross-sectional view of a typical frustro-conical-shaped nipple.

DESCRIPTION OF THE PREFERRED EMBODIMENT

Figure 4:
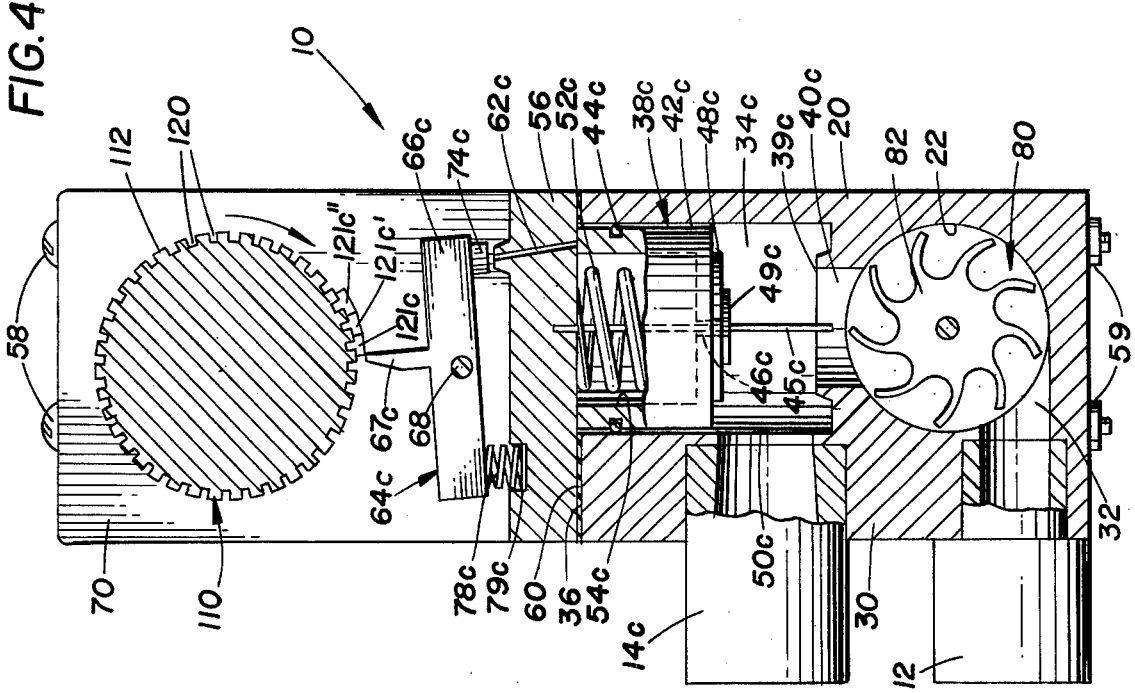
FIG. 4 is a cross-sectional view taken substantially along line 4—4 of FIG. 2 illustrating the valve means in an open mode of operation.

Referring now to the drawings, FIG. 1 illustrates an overall view of the present hydraulic-metering, multiple-valve device, generally indicated at 10, said valve device being adapted to connect between a fluid inlet line 12 and a plurality of fluid outlet lines 14 for selectively conducting the fluid from line 12 to any one or more of lines 14. For purposes of explanation, said multiple-valve device 10 is shown as having three fluid-outlet lines 14a, 14b, and 14c; however, it will be readily obvious to those skilled in the art that said multiple-valve device 10 may have any desired number of outlet lines and corresponding valve means. Thus, each outlet line 14a, 14b, and 14c is connected to its respective valve mechanism which is identical to the others, the parts of which will be identified by the same numerals, but the letters $a$, $b$ and $c$ will be added to such numerals to designate which of the parts are specific to outlet lines 14a, 14b, and 14c. All parts not having one of the letters $a$, $b$ and $c$ as a part thereof will be considered to be common to all outlet lines.

The hydraulic-metering, multiple-valve device comprises a generally rectangular body 20 which houses a plurality of valve means or mechanisms, generally indicated at 16a, 16b, and 16c. Located within the lowermost portion of the valve, housing 20 has an elongated bore forming channel 22 therein which extends from the side wall 24 to the opposite end wall 26 thereof, wherein the open end is closed and sealed by partition 28 and secured therein.

Figure 3:
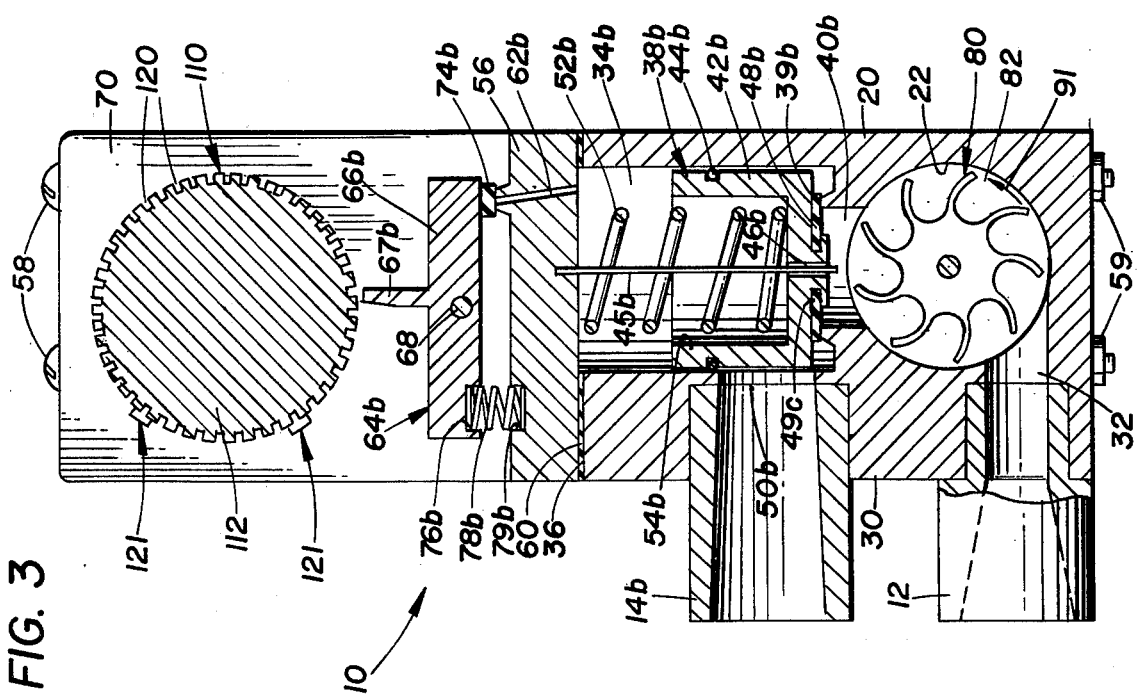
FIG. 3 is a cross-sectional view taken substantially along line 3—3 of FIG. 2, wherein the inlet is shown broken away.

Disposed within the front wall 30 of the body 20 is an inlet port 32 adapted to receive said inlet lne 12 at right angles to said channel 22, as seen in FIGS. 3 and 4, thus providing a direct connection to a supply of fluid, such as water, via inlet port 32. Hence, water conducted into channel 22 via inlet line 12 and inlet port 32 not only controls the sequential operation of the device 10, but is also selectively directed to any one of outlets 14a, 14b and/or 14c for conduction to any utilization apparatus, such as a series of sprinkler heads.

Valve housing 20 includes a plurality of parallel, spaced bores 34a, 34b, and 34c which extend laterally therethrough, perpendicular to said channel 22, from the top surface 36 thereof to chamber 22, wherein valve means, indicated generally at 38a, 38b and 38c, respectively, are contained therein. The lower ends of bores 34a, 34b, and 34c are formed into valve seats 39a, 39b and 39c, respectively, defining communicating ports 40a, 40b and 40c, respectively.

Valve means 38a, 38b, and 38c include piston valves 42a, 42b, and 42c, each piston being identical and having a diameter slightly less than the inside diameter of the respective bores 34a, b, and c, and being provided with a groove in the periphery thereof for receiving O rings 44a, 44b, and 44c. Said O rings prevent fluid passage between the piston valves and the respective walls of the bores 34a, b, and c. On the other hand, a restricted amount of fluid is allowed to pass from channel 22 through the piston heads via passageways 46a, b, and c of the respective bottom walls of the piston valves. Passageways 46a-46c will hereinafter be more fully described.

A valve gasket 48a, 48b, and 48c is adapted to be positioned adjacent the bottom wall of each piston and held in place thereon by respective annular flanges 49a, 49b, and 49c disposed and formed as a part of each bottom wall of each respective piston valve.

Gaskets 48a-48c are adapted to rest on respective valve seats — preventing the flow of fluid from channel 22 into respective piston bores 34a, b, and c. Thus, no fluid flows through outlet lines 14a, b, and c.

Therefore, from the foregoing description of the valve means, it should be understood that any number of the identical valves can be added to the present device.

Referring now to FIGS. 1, 3 and 4, there is illustrated a valve housing 10 which includes a plurality of parallel, spaced outlet ports 50a, 50b, and 50c adapted to receive outlet lines 14a, 14b, and 14c, respectively. These outlets extend laterally through the front wall 30 of housing 20 and terminate in communication with each respective piston bore 34a-34c, at the lower ends thereof, adjacent valve seats 39a-39c, respectively. Thus, water can be conducted from fluid-inlet line 12 to any of said fluid-outlet lines 14a-14c by controlling the position of valve means 38a-38c.

FIGS. 2 and 3 illustrate valve pistons 42a and 42b as being in a closed mode of operation, with gaskets 48a and 48b of the respective valve means 38a and 38b in contact with valve seats 39a and 39b, respectively — hence, fluid is prevented from flowing from fluid inlet 12 to fluid-outlet lines 14a and 14b. However, as shown in FIGS. 2 and 4, piston valve 38c is in an elevated position, or open mode of operation, with gasket 48c spaced from valve seat 39c — thus permitting fluid to flow from inlet line 12 through channel 22 and piston bore 34c and then discharge by way of outlet port 50c into outlet line 14c.

To aid in providing a tight seal between each gasket and its corresponding valve seat, there is included a biasing means, such as spring 52a, 52b, and 52c, with each being received within piston recess 54a, 54b and 54c, respectively, said springs being held in a downwardly-biasing force by a substantially-flat, generally-rectangular, valve-housing-cover plate 56 which extends across the top of valve housing 20 and is secured thereto by bolts 58, which extend through housing 20 and are secured in place by nuts 59. A gasket 60 is disposed between the top surface 36 of valve housing 20 and said valve-housing-cover plate 56, thus preventing leakage therebetween from piston bores 34a-34c. However, piston bores 34a-34c can be exposed to the atmosphere via passageways 62a, 62b, and 62c, respectively. Said passageways extend through valve housing cover 56.

Said hydraulic-metering, multiple-valve device 10 further includes a plurality of identical valve-actuating mechanisms, generally designated 64a, 64b, and 64c which provide a means by which respective piston bores 34a-34c can be vented to the atmosphere via passageways 62a-62c, respectively. Valve-actuating mechanisms 64a, b, and c, as seen in FIG. 2, each comprise a rocker arm 66a, 66b, and 66c pivotally mounted to a common shaft 68 and equally spaced apart by spacer sleeves 69. Said shaft is fixedly mounted to end-support walls 70 and 72, wherein said walls are secured to the housing cover 56 and housing 20 by said bolts 58. Rocker arms 66a-66c are provided with vertically-extending tongues 67a, 67b, and 67c, respectively.

Referring more specifically to valve-actuating mechanism 64b, as seen in FIG. 3, one end of said rocker arm 66b is provided with a small gasket member 74b attached to the under surface thereof, said gasket 74b being positioned above passageway 62b and shown in direct contact therewith. The opposite end of rocker arm 66b has a recess 76b in the lower surface thereof for receiving and retaining one end of a biasing spring 78b. The upper surface of said valve-cover plate 56 has a similar recess 79b disposed therein, directly below recess 76b, for receiving and retaining the other end of spring 78b. Thus, spring 78b biases rocker arm 66b in a clockwise direction — thereby holding gasket member 74b against the upper surface of valve-housing-cover plate 56, whereby passageway 62b is sealed from communication with the atmosphere. On the other hand, rocker arm 66b can be rotated in a counter-clockwise direction, compressing spring 78b and lifting said gasket 74b off cover plate 56 — thus permitting bore 34b to be vented to the atmosphere via passageway 62b. A further detailed explanation will be hereinafter described.

Valve-actuating mechanisms 66a and 66c are identical to valve-actuating mechanism 66b and have corresponding parts designated by the same numerals followed by letters a and c, respectively. Accordingly, a detailed description thereof is not necessary, and no separate discussion is included herein. However, valve-actuating mechanism 66c is clearly shown in FIG. 4 wherein the rocker arm 66c is shown in a rotated position, with spring 78c compressed and gasket 74c spaced from the top of valve-housing cover 56.

A drive means, generally designated at 80, comprises an impeller 82 rotatably disposed within channel 22 and directly in line with the inlet port 32. Said impeller is fixedly mounted to a drive shaft 84 which is rotatably supported and journaled in wall 24 at one end thereof; and the opposite end of said drive shaft is provided with a reduced-diameter, extended, free end 86, wherein said free end 86 is supported and journaled in partition 28, and extends outwardly therefrom as seen in FIG. 2. An O-ring seal 87 is provided about the extended free end 86 and disposed within partition 28, thus preventing fluid leakage therethrough. To also prevent leakage from channel 22 an additional O ring 88 is disposed about the peripheral wall of partition 28.

Affixed to said free end 86 of shaft 84 is a gear 89 which is positioned for direct engagement with a gear train means, generally indicated at 90, which is clearly illustrated in FIGS. 2 and 5.

Accordingly, as the water enters through inlet line 12, which serves as a nozzle, and passes inlet port 32, the force thereof causes the impeller 82 to rotate counter-clockwise, as indicated by arrow 91— thus rotating the shaft 84 along with gear 98 in the same direction, said gear 89 being rotated at a high rpm directly proportional to the fluid flowing through inlet port 32.

At this time, the rotating energy of gear 89 is transmitted to the gear train 90 by direct engagement of said gear 89 to one of the gears of the gear train 90. The gear train comprises a first set of reduction gears 92a, 92b, and 92c, each being provided with reduced-diameter gears 93a, 93b, and 93c, respectively. A second set of reduction gears is included wherein gears 94a, 94b, and 94c mesh with respective gears 93a, 93b, and 93c, each of said gears 94a, b, and c also including a reduced-diameter gear 95a, 95b, and 95c. Gears 95a and 95b mesh with gears 92b and 92c, respectively, and gear 95c engages a single enlarged gear 96.

The first set of gears 92a–92c and 93a–93c are freely rotatable about pin 98 which is secured in wall 26; and the second set of gears 94a–94c and 95a–95c are freely rotatable about pin 99 which is also secured to wall 26 of the housing 20.

Gear 96 is rotatably mounted to a pin 100 and is engaged by a pivot gear 102 rotatably mounted through pin 104 to a pivot arm 105 which is also freely supported on shaft 100. Said gear 102 is spring biased into engagement with gear 96 by spring 105 connected between wall 72 and arm 105. Gear 102 also engages drum gear 103, said drum gear being fixedly attached through drum shaft 109 to a timer-sequential metering means, generally indicated at 110. The timer-sequential metering means comprises a cylindrical drum 112 which is disposed between end walls 70 and 72, said drum having end shaft 109 to which gear 108 is affixed and a shaft 114 secured to the opposite end of drum 112. Shaft 109 is rotatably journaled in end wall 72 while shaft 114 is journaled for rotation in wall 70. Hence, the drum rotates through gear engagement with the gear-train means 90, which in turn is driven by drive means 80. To protect the gear train a removably cover 115 is positioned thereover and held in place by a pair of screws 116.

Referring now to FIGS. 1, 2, 3, 4 and 6, drum 112 has a plurality of parallel, spaced, elongated grooves 120 in the outer surface thereof, grooves 120 being adapted to receive a plurality of T-shaped actuating pins 121. The base portion 122 of pins 121 is adapted to be pressed into grooves 120 so that the bar portion 123 extends beyond the surface thereof. As shown most clearly in FIG. 3, drum 112 extends across the top of valve housing cover 56, above rocker arms 66a–66c. The positioning of drum 100 is such that there is only a very small clearance between the tops of tongues 67a–67c and the outer surface of drum 112. However, when pins 121 are positioned within grooves 120, there will be no clearance between the bar portions 123 thereof and the top of tongues 67a–67c. Thus, if one of pins 121 is positioned in the same plane as one of rocker arms 66a, 66b, or 66c, such pin 121 will contact the associated tongue 67a, 67b, or 67c as drum 112 rotates.

In operation, the timer-sequential-metering means is adapted to selectively connect fluid inlet 12 to any of fluid outlets 14a, 14b, and/or 14c, in any sequence, for any amount of time. At the start of the timing sequence, each of the piston valves 42a, 42b, and 42c are in their downwardmost position, with gaskets 48a, 48b, and 48c in contact with valve seats 39a, 39b, and 39c, respectively. In this position, water is prevented from flowing from channel 22 via bores 34a, 34b, and 34c to fluid outlets 14a, 14b, and 14c, respectively. Each of rocker arms 66a, 66b, and 66c is in its generally horizontal position, as shown in FIG. 3.

At this time, the water pressure is channel 22 is maintaining piston valves 42a, b, and c downwardly along with their respective springs 52a, b, and c, thereby preventing the flow of water to fluid outlets 14a, b, and c. More specifically, and considering valve mechanism 38a, for example, the water in channel 22 passes through passageway 46b into bore 34b. Therefore, the water pressure in bore 34b is the same as in channel 22, thus allowing spring 52b to bias piston valve 42b in a downward closed position.

Consider now the operation of valve mechanisms 38a, b, and c. Assume, for example, that it is first desired to open valve mechanism 38c to connect fluid inlet 12 to fluid outlet 14c. A pin 121c would then be inserted in one of grooves 120 in such a position that it passes directly above rocker arm 66c as drum 112 rotates. To start the flow operation, drum 112 is rotated clockwise until pin 121c reaches and engages tongue 67c. Rotation of drum 112 is easily accomplished due to pivotal gear 102 — which will automatically disengage gear 108 when power is applied directly to drum 112 in a clockwise direction. As gear 108 is manually rotated clockwise, gear 102 will walk around gear 108 by way of the movement of pivotal arm 105. The spring 106 pulls gear 102 back into engagement with gears 108 and 96, when manual rotation of drum 112 stops.

Therefore, and as shown in FIG. 4, pin 121c pushes the top of tongue 67c to the left, thereby pivoting rocker arm 66c in a counter-clockwise direction around shaft 68. Accordingly, gasket 74c is elevated above the top surface of valve-housing cover 56, permitting fluid communication between bore 34c and the atmosphere via passageway 62c.

When this occurs, the downward pressure on piston valve 42c is immediately reduced to zero, wherein the fluid pressure in channel 22 overcomes the biasing force of spring 52c and thereby forces said piston valve 42c upward, as shown in FIGS. 2 and 4. As soon as this occurs, the water in line 12 and channel 22 is permitted to pass between valve seat 39c and gasket 48c to outlet port 50c and into outlet line 14c.

It will also be noted that, at the same time, water continues to pass through passageway 46c into bore 34c. When valve 42c moves upwardly, the water in bore 34c is forced out through passageway 62c and, as long as valve 42c is open, water continues to pass out of passageway 62c. However, by making passageway 46c and passageway 62c quite small, only a small trickle of water escapes from device 10. In addition, to prevent passageways 46a–46c from becoming clogged, valve-housing cover 56 may support three rods 45a, 45b, and 45c which extend through passageways 46a, 46b, and 46c, respectively, and perform the function of cleaning passageways 46a–46c as piston valves 42a–42c, respectively, move up and down.

Valve mechanism 38c remains open, permitting fluid flow from fluid inlet 12 to fluid outlet 14c, as long as gasket 74c remains elevated, permitting fluid communication between bore 34c and the atmosphere via passageway 62c. According to one embodiment of the invention, the spacing between grooves 120 and the width of pins 121 relative to the rate of rotation of drum 112 is such that each pin 121 maintains rocker arm 66c in the position shown in FIG. 4 for a pre-determined amount of time relative to the flow of fluid entering channel 22, whereby the impeller rotates accordingly. At the end of such period of time, pin 121c moves past tongue 67c, permitting spring 78c to return rocker arm 66c to its closed position. If, on the other hand, it is desired to maintain valve mechanism 38c open for a longer period of time, it is simply necessary to put additional pins 121, such as pins 121c' and 121c'' in the next grooves 120 so that, when pin 121c releases tongue 67c, the second pin 121c' takes over, preventing any movement of rocker arm 66c. Thus, by the simple provision of positioning one or more pins 121 in grooves 120, valve mechanism 38c may be opened, at any time, for any amount of time.

As an example, the present invention gear train 90 reduces the revolutions of impeller 82 from 900,000 revolutions to one revolution of the drum 112; and the total flow required to make the impeller revolve 900,000 revolutions is 6,480 gallons. It can, therefore, be stated that each segment of drum 112 represents so many gallons. Thus, if the drum has 36 pins 121, then each pin would represent 180 gallons of water. Hence, if one parcel of land is to receive 1,800 gallons, another 900 gallons and a third 360 gallons, then the first valve mechanism 38a will have 10 pins 121a, said pins being positioned directly above rocker arm 77a and secured in drum 112. The second valve mechanism 38b will operate with 5 pins 121b and the third valve mechanism 38c will be activated by 2 pins 121c.

Thus, the multiple-metering valve device 10 will send specific pre-determined amounts of water to given areas, irrespective of the water system pressure variations or restriction changes — both upstream or downstream of the valve.

When pin 121c'' releases tongue 67c, rocker arm 66c returns to the position shown in FIG. 3. When this occurs, the water passing into piston bore 34c cannot escape through passageway 62c, and piston bore 34c begins to fill with water. The water pressure is then restored to piston bore 34c; and spring 52c immediately forces piston valve 42c downward until gasket 48c comes into contact with valve seat 39c. This then signals the termination of the water flow from fluid inlet 12 to fluid outlet 14c.

By positioning still other pins 121a and 121b in grooves 120 so that such pins pass above rocker arms 66a and 66b, respectively, drum 112 will operate to open valves 42a and 42b as it rotates. Thus, it is possible to activate valves 42a–42c in any sequence and to individually select the amount of water to flow through each valve. It is also obviously possible to reopen any one of valves 42a–42c any number of times, the only limit being the number of grooves in drum 112 and the number of rotations of drum 112 during a given sequence.

ALTERNATIVE EMBODIMENTS

Referring now to FIG. 7, there is shown a portion of the valve device 10 wherein the drive means and gear-train means have been altered.

Drum 112 is provided with fixed gear 108, as hereinbefore described, along with pivot gear 102 rotatably mounted to the pivot arm 105, which is in turn pivotally supported on pin 100, said pivot gear being forced into biasing engagement with both gear 108 and gear 96 by biasing means, such as spring 106 attached at one end to arm 106 and at the other end thereof to wall 72.

Engaging gear 96 is a drive gear 130 which is fixed to a drive shaft 122 of motor 134. Motor 134 is shown as an electric motor; however, various mechanical motors can be substituted therefor.

As brought out in the preceeding description of the present invention, the continuous operation of the valve device 10 depends on the arrangements of the pins 121, whereby at least one valve-actuating mechanism 64 must make contact with a corresponding pin 121 prior to the preceeding valve-actuating mechanism becoming disengaged with its corresponding pin. When the last actuating mechanism 64 is inactivated, the flow of water stops. Accordingly, to start the water flow through device 10, drum 112 is manually rotated until one of the pins 121 engages its corresponding valve-actuating mechanism 64, at which time the device runs through a complete cycle.

However, the hereinafter-described arrangement of the valve device 10 is initially activated automatically by a continuously-operating, power-drive, timing means, generally indicated at 150. By employing the power-drive, timing means 150, and attaching said means 150 to the valve device in the required manner, the timing cycle will thereby become completely automated, wherein an operator is no longer needed to initiate the start cycle, as in the preceeding arrangement.

Said power timing means 150 comprises a plurality of timing gears 152 and 153 which are secured together, or integrally formed, so as to freely rotate about the drum shaft 114 that extends outwardly from wall 70. Prior to mounting timing geas 152 and 153, a mounting plate 144 is positioned on the end of the valve device 10 opposite that of the gear train means 90.

The mounting plate 154 is secured to wall 70 by means of screws 156 and is provided with indicia of numbers presenting 24 hours of the day. To be easily read, the numbers are radially disposed thereon about the peripheral edge of the largest timing gear. (In this application, it is gear 152.) It should be noted that other sized timing gears can be adapted thereon — depending on a particular timing sequence desired. That is, the timing sequence can be set for one, two, three days, or more, with sequences depending on the timing gear selected — further details of which will hereinafter be described.

Included in the power timing means 150 is a clock motor 160 of the variety that produces a very low torque. The particular clock motor 160 as shown in FIG. 8 uses a battery 162 as its power source, wherein a compartment 164 is provided in the motor housing 166. Said motor 160, therefore, is a self-contained, power unit that is removably attached to cover plate 154.

The means for removably attaching the motor 160 to the cover plate 154 also provides a vertical adjustment. There are various attaching means contemplated; however, there is shown in FIG. 8 a mounting block 168, secured to cover plate 154, having a plurality of longitudinal, transverse grooves 170 and 172 — a flange 174 of motor housing 166 being adapted to be removably received in either groove.

Extending outwardly from the clock motor is a drive shaft 174 having a small drive gear 175 which is adapted to engage gears 152 and 153. The engagement of drive gear 175 with either timing gear 152 or 153 will depend on the sequential operation of the valve device 10. As herein illustrated, timing gear 152 would be provided with 72 teeth for rotation — of one revolution every three days — by means of drive gear 175 which would include 12 teeth and rotates at a rate of one revolution per 12 hours. Hence, if a two-day sequential operation is desired, then the cock motor is positioned in groove 170, whereby drive gear 175 engages timing gear 153, as shown in phantom lines in FIG. 8. Said gear 153 is provided with 48 teeth; therefore, four revolutions of gear 175 will cause gear 153 to revolve one revolution per 48 hours.

The following description will relate to the three-day cycle, as shown in FIG. 9, wherein drive gear 175 engages timing gear 152. Attached to timing gear 152 is a lug member 176 having a cam surface 178. Said lug extends outwardly from the face of gear 152 and directly engages drive pin 180 which is mounted to shaft 114 of drum 112; therefore, any rotational movement of gear 152 in a clockwise driection, while lug 176 is engaging drive pin 180, causes drum 112 to also rotate therewith. It should be clearly understood that engagement of lug 176 and pin 180 takes place only when the valve device is in an inoperative mode; i.e., no water is flowing therethrough.

Accordingly, cam lug 176 and pin 180 are shown in FIG. 9 as being positioned adjacent number 18 of the dial indicator 182; and, at this time, valve-actuating pin 121a is in vertical alignment with pin 180 — and thus rotates therewith — so that, when pin 180 reaches point 0 on the dial indicator, pin 121a engages tongue member 185a, as illustrated in FIG. 10, and starts the sequential operation of the valve device through a complete watering cycle. Once the valve device 10 becomes operational, the rotation of the drum is regulated by rotation of the impeller 82, as previously described.

Due to the speed of the impeller 82, the drum 112 will generally revolve at a much faster rate than that provided by the clock motor; and, thus, pin 180 will advance to a point where the valve operational cycle ends. At this time the drum 112 remains stationary until the cam lug 176 again rotates to a point of engagement with pin 180, thereby forcing the drum 112 to rotate according to the low torque of the clock motor.

Cam surface 178 of the lug 176 has a provision which allows the pin 180 to override the lug 176 when an initial time setting is required. However, once the device is adjusted to the desired cycle, the clock motor will then continuously operate the valve device 10.

Referring now to FIG. 10, the valve-actuating mechanism 186a comprises a rocker arm 187a having said vertically-extending tongue 185a positioned adjacent the end of the rocker arm 187a directly above the spring 188a. Except for the change in the tongue 185a, said mechanisms 186a is identical to those previously described. The tongue 185a extends upwardly — terminating adjacent the mid-portion of the cylindrical drum 112 — and includes an inclined back wall 189a whereby pin 121a can engage the tongue along the inclined surface 189a, thereby allowing a very low torque motor to be employed, as herein indicated.

It should also be mentioned that the upper, terminating end of passage 190a is defined by a frustro-conical-shaped nipple 192a, as shown in FIG. 11, said nipple being provided with a valve-seat surface 194a. The thickness of the seat, as indicated by A, should be preferably a knife edge, wherein the maximum thickness should not exceed 0.050 of an inch. It has been found that a thickness greater than 0.050 of an inch would require an increase in torque to arm 187a. Thus, the wall thickness range would be from knife edge to 0.050 of an inch, with the passage 190a having a diameter of approximately 0.030 of an inch.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and we do not wish to be restricted to the specific form shown or uses mentioned, except as defined in the accompanying claims.

We claim:
1. A hydraulic-metering, multiple-valve device comprising:
   a valve housing having an inlet port and a plurality of outlet ports, and a fluid-flow channel common to all outlet ports disposed therebetween having communicating ports arranged therein to allow fluid flow between said inlet and outlet ports;
   a plurality of piston bores intersecting said flow channel and said outlet ports;
   a cover plate having a plurality of passageways communicating between each piston bore and the atmosphere, whereby fluid in said bore is allowed to discharge when said piston valve is moved to an open position;
   a plurality of valve means positioned between said flow channel and said outlet ports, whereby fluid flow from said flow to said outlet ports is controlled, and wherein each of said valve means comprises:
   a valve piston slidably disposed within each of said piston bores to provide a closed or open valve position therein:
   a gasket removably secured to said valve piston;
   a valve seat positioned adjacent said channel adapted to accommodate said gasket when said valve piston is in a closed position;
   biasing means connected to said piston valve whereby said valves are held in a normally-closed position;
   a drum rotatably mounted to said valve housing;
   a plurality of valve-actuating means connected between said drum and corresponding valve means for selectively opening and closing each of said valve means as said drum rotates;
   wherein each of said valve-actuating means comprises:
   a rocker arm rotatably supported to said valve housing, said arm having a vertical tongue integrally formed thereon;
   a gasket secured to the undersurface of said rocker arm for direct sequential engagement with said cover-plate passageway, thereby controlling the position of said piston valve within said valve housing; and
   a spring positioned between said rocker arm and said cover plate, whereby said rocker arm is biased to close said cover-plate passageway to the atmosphere;
   a drive means for rotating said drum, said drive means being positioned down stream of said inlet port of said valve housing and disposed in said fluid flow channel and being operably connected to said drum, wherein said drive means comprises:
   an impeller rotatably mounted within said flow channel, the impeller being positioned adjacent said inlet port, whereby fluid flow therethrough rotates said impeller;
   a drive shaft having said impeller affixed at one end thereof and rotatably mounted within said valve housing; and
   a drive gear affixed to the opposite end of said drive shaft for direct engagement with said gear train means; and a gear-train means operably connected between said drum and said drive means.

2. A hydraulic-metering, multiple-valve device as recited in claim 1, wherein said drum includes:
a plurality of longitudinal grooves disposed about the peripheral surface thereof;
a plurality of pins adapted to be adjustably received in said grooves for selective engagement with said vertical tongues of said rocker arm, whereby a pre-determined amount of water can be allowed to flow through selective valve means in a sequential manner; and
a driven gear fixedly attached to one end of said drum for direct engagement with said gear-train means.

3. A hydraulic-metering, multiple-valve device as recited in claim 2, wherein said gear-train means includes:
a pivotal gear;
a pivotal arm having said pivotal gear mounted thereto; and
a biasing spring connected between said arm and said valve housing, whereby said pivotal gear is biased into engagement between said driven gear of said drum and one of said gear-train gears and, conversely, allowed to disengage therefrom when said drum is directly rotated in a clockwise direction.

4. A hydraulic-metering, multiple-valve device as recited in claim 2 wherein said device includes an electric motor operably engaging said drum, whereby said drum is actuated thereby.

5. A hydraulic-metering, multiple-valve device as recited in claim 2, wherein said device includes a power-drive, timing means removably attached to said valve housing and operably connected to said rotatable drum.

6. A hydraulic-metering, multiple-valve device as recited in claim 5, wherein said power-drive, timing means comprises:
a plurality of timing gears rotatably mounted to said drum;
a cam lug secured to at least one of said timing gears;
a drive pin fixedly secured to said drum for rotation therewith, said pin positioned to engage said cam lug whereby said drum will rotate with said timing gear; and
a clock motor having a low-torque output removably mounted to said valve device and operably connected to said timing gears for direct rotation thereof.

7. A hydraulic-metering, multiple-valve device as recited in claim 6, wherein said clock motor includes:
an extended shaft;
a drive gear fixedly secured to said shaft for direct engagement with one of said timing gears; and
wherein said power-drive, timing means also includes:
a mounting plate removably attached to one end of said valve device;
a sequential, numerical indicia disposed on said mounting plate and positioned radially about said timing gears, whereby sequential operation of said valve means can be selected; and
means for removably attaching and adjusting said motor to said device, whereby said drive gear of said motor is allowed to directly engage one of said selected timing gears, wherein the rotation of said drum is controlled when said drive pin is engaged with said cam lug.

8. A hydraulic-metering, multiple-valve device as recited in claim 7, wherein said tongue of said valve-actuating means extends upwardly and tangentially to said drum, said tongue having a rear, inclined, cam surface for engagement with said pins of said drum.

9. A hydraulic-metering, multiple-valve device as recited in claim 8, wherein said cover plate of said valve housing includes a plurality of frustro-conical-shaped nipples wherein the upper end of each of said passages disposed in said cover plate terminates therethrough, each of said nipples a valve seat defined thereon.

10. A hydraulic-metering, multiple-valve device as recited in claim 9, wherein the maximum thickness of each of said valve seats is 0.050 of an inch, whereby each of said gaskets of said rocker arms is adapted to seat thereon in a positive manner.

* * * * *